(12) United States Patent
Stubbs et al.

(10) Patent No.: US 7,779,303 B2
(45) Date of Patent: Aug. 17, 2010

(54) TARGETED REGRESSION TESTING

(75) Inventors: Keith Stubbs, San Jose, CA (US); Madhuri Vemulakonda, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 570 days.

(21) Appl. No.: 11/679,434

(22) Filed: Feb. 27, 2007

(65) Prior Publication Data

US 2008/0209276 A1  Aug. 28, 2008

(51) Int. Cl.
*G06F 11/00* (2006.01)
(52) U.S. Cl. .................................... 714/38
(58) Field of Classification Search .............. None
See application file for complete search history.

(56) References Cited

U.S. PATENT DOCUMENTS

| 5,490,249 | A  * | 2/1996  | Miller ........................ 714/38 |
| 5,694,540 | A  * | 12/1997 | Humelsine et al. ............ 714/38 |
| 5,778,169 | A  * | 7/1998  | Reinhardt .................... 714/38 |
| 6,748,584 | B1 * | 6/2004  | Witchel et al. ............. 717/136 |
| 6,957,366 | B1 * | 10/2005 | McDonald ................... 714/38 |
| 6,986,125 | B2 * | 1/2006  | Apuzzo et al. ............. 717/124 |
| 7,178,063 | B1 * | 2/2007  | Smith ........................ 714/38 |
| 7,457,989 | B2 * | 11/2008 | Ulrich et al. ............... 714/38 |
| 7,493,521 | B1 * | 2/2009  | Li et al. ...................... 714/38 |
| 2005/0043919 | A1 * | 2/2005 | Kennedy et al. ........... 702/182 |
| 2005/0081106 | A1 * | 4/2005 | Chang et al. ............... 714/38 |
| 2005/0166094 | A1 * | 7/2005 | Blackwell et al. ........... 714/38 |
| 2005/0204201 | A1 * | 9/2005 | Meenakshisundaram et al. .......................... 714/38 |
| 2005/0262399 | A1 * | 11/2005 | Brown et al. ................. 714/38 |
| 2006/0107121 | A1 * | 5/2006 | Mendrala et al. ............ 714/38 |

OTHER PUBLICATIONS

S. Elbaum, P. Kallakuri, A. Malishevsky, G. Rothermel, and S.Kanduri, "Understanding the Effects of Changes on the Cost-Effectiveness of Regression Testing Techniques", *Journal of Software Testing, Verification, and Reliability*, 13-2:65-83, Feb. 2003.

* cited by examiner

*Primary Examiner*—Michael C Maskulinski
(74) *Attorney, Agent, or Firm*—Baker Botts L.L.P.

(57) ABSTRACT

A software testing method. In particular implementations, a method includes accessing a first database of one or more bug entries, wherein each bug entry comprises information characterizing a bug, an associated code component, and a test script; and a mapping between the component and one or more scripts that test the code component; for one or more bug entries in the first database, determining if the bug is a new bug; if the bug is not a new bug, determining if the test script is new relative to the bug; and if the bug is a new bug or if the test script is new relative to the bug, accessing a second database of the script-to-component mappings to add a mapping between the test script and the associated code component of a respective bug entry.

9 Claims, 4 Drawing Sheets

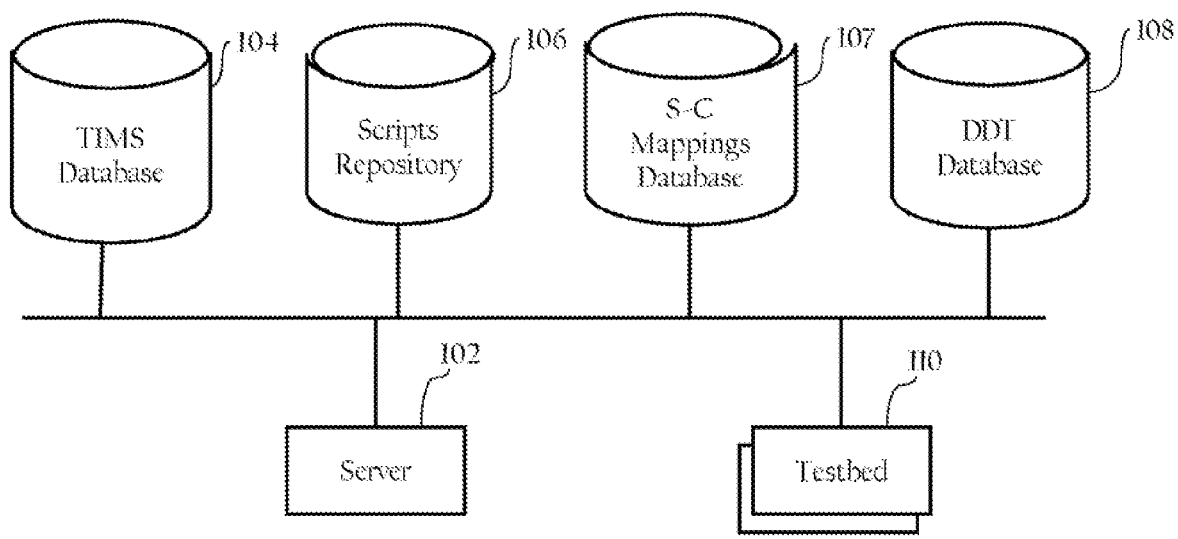
Fig._1

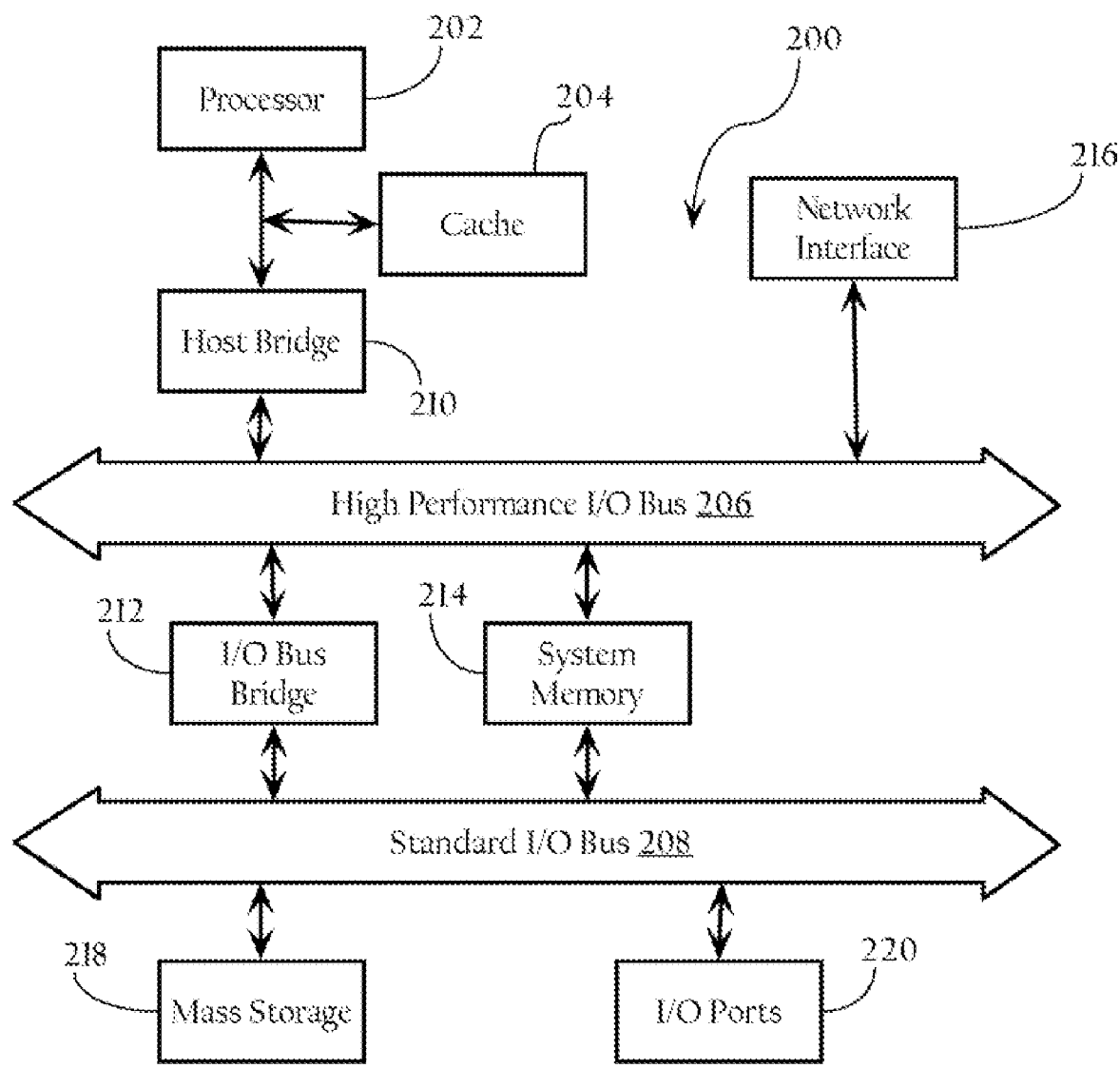
Fig._2

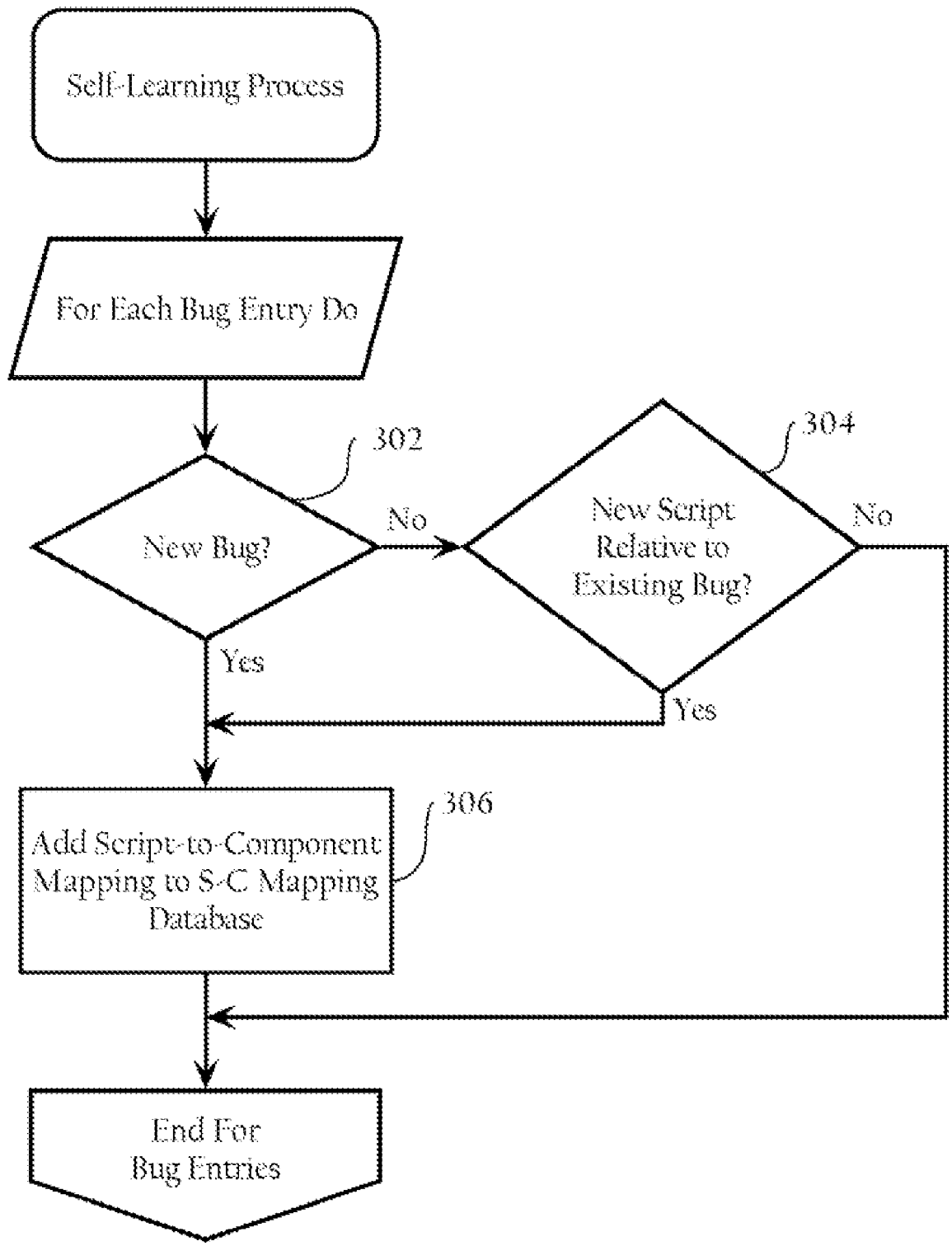
Fig._3

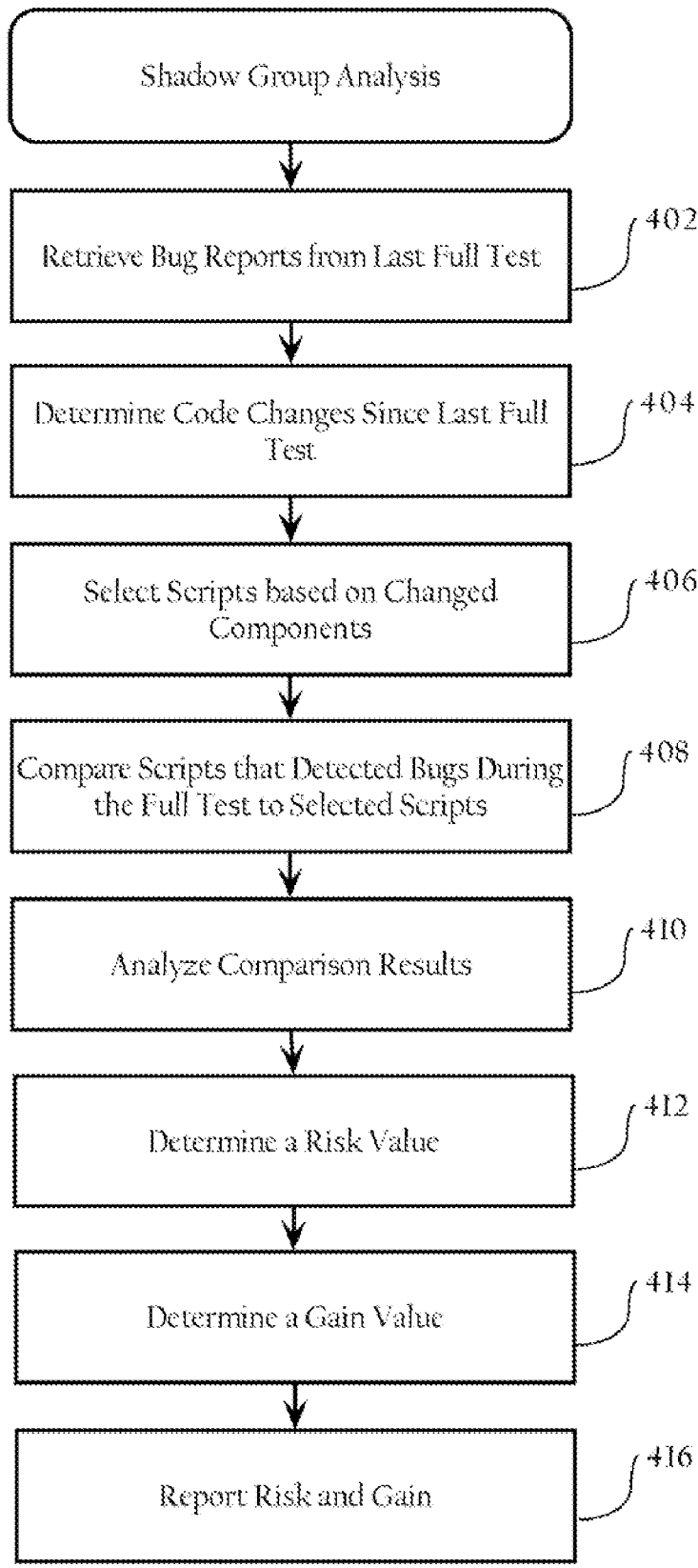
Fig._4

TARGETED REGRESSION TESTING

TECHNICAL FIELD

This disclosure relates generally to software testing systems.

BACKGROUND

Software testing analyzes the functional correctness, quality and reliability software code used in various systems, such as routers, switches, etc. Technologies are changing rapidly as users from a wide range of backgrounds and vertical industries have brought technology into homes, offices, and increasingly into the public air space. As a result, software is continuously updated to keep pace with the changing technologies and growing needs of the market. Software code is typically divided into software components, and each component is tested to identify failures of "bugs." Identifying such bugs enables engineers and software developers to modify components to fix the bugs. Engineers also modify components to add new components to software code in order to introduce new features and capabilities. Typically, engineers may also develop one or more tests embodied in scripts or other code modules to test the new components. Engineers typically test software using testing scripts, which automate manual testing steps. A given script may test for known bugs in one or more components and may also discover new bugs. For example, a set of scripts may cause a server to transmit packets to a port of a router. The packets may contain information that illicit particular functions at the router (e.g., return certain information or acknowledgements). Some packets may simulate denial-of-service attacks to test the security of the software code. The software code, including all or a subset of its components, to be tested are typically loaded into a testbed, which could be a router hardware platform, switch hardware platform, access point hardware platform, or other network device, for example, that is connected to a testing environment. In other implementations, a test bed may comprise a server operative to provide a simulated or virtual testing environment for the software code to be tested. A testing application may then execute one or more test scripts to test one or more aspects of the software code.

DESCRIPTION OF THE DRAWINGS

FIG. 1 illustrates example components in a targeted regression testing (TRT) system.

FIG. 2 illustrates an example hardware system, which may be used to implement a server.

FIG. 3 illustrates an example method associated with self-learning for targeted testing.

FIG. 4 illustrates an example method for determining risk and gains associated with targeted testing.

DESCRIPTION OF EXAMPLE EMBODIMENTS

A. Overview

Particular embodiments provide a targeted regression testing (TRT) application that, in a targeted regression testing mode, selects a set of test operations for software code to be tested. In one implementation, the testing system also allows users to run a full set of tests directed to all components of a given software code. A targeted test set tests a subset of the components of a given software code, where the subset may include only the components that have changed since a previous version. In one implementation, the regression testing aspect of the application includes a self-learning component that automatically updates mappings between test scripts and software components to which the test scripts are respectively directed. The updated mappings, in particular implementations, are based on the historical test results of the test scripts. For example, during testing, a failing component may not necessarily be mapped to the script that caused the failure. In a self-learning process, the TRT management application corrects or updates the script-to-component mappings to associate the test script that caused the failure to the software component that failed.

Other implementations of the invention are directed to providing information regarding the tradeoffs between performing full tests and targeted testing of less than all software components. According to another implementation, the test management application performs a shadow analysis of the software code testing, where the test management application compares full test results to targeted test set results to determine the risk and gains of running the targeted test set in future tests. Because the targeted test set may free up resources such as engineers, testbeds, and associated scripts, the freed up resources become available for other tests (e.g., for additional software versions or for other product trains). The shadow analysis results assist a user in making intelligent decisions with regard to allocating test resources for testing software code for different product trains and different software code versions.

B. Example Test System Architecture

B.1. System Topology

FIG. 1 is a schematic diagram that illustrates example components of a targeted regression testing (TRT) system. In a specific embodiment of the present invention, the system includes a server 102, a test information management system (TIMS) database 104, a scripts repository 106, a script-to-component mappings database 107, a distributed defect tracking (DDT) database 108, and one or more test beds 110.

A testbed 110 is a testing facility that may be used to test software code, as well as hardware onto which firmware or software is loaded. In one implementation, a testbed 110 could be a generic facility operative to use test scripts to test a variety of different software types, or a more specific facility operative to test the behavior of software on specific hardware or platform types, such as routers, switches and the like. For example, scripts may cause a test bed to fire packets into the ports of a device (e.g., a router) in various ways in order to emulate a client at each port. In one implementation, test beds 110 may access script repository 106 to retrieve selected test scripts for execution. In one implementation, the testbed 110 may be logically mapped to other testing resources, such as engineers or particular scripts associated with the test beds 110. A testbed may also include one or more computing systems or work stations for engineers to control operation of the test bed. Different resources may be combined to test different capabilities of the software code. In another implementation, a test bed 110 may be a computer platform that is adapted for software testing. In one implementation, the computer platform may simulate operational software not on the hardware platform on which it is intended (e.g., on a router) but on the computer platform itself, where the computer platform can simulate physical events.

As described above, the test management application may test software code using a full set of tests (based on all components of the tested software) or a targeted set of tests (based on those components that have changed since a prior release or version of the code). Examples of such components may include DHCP server modules, network protocol stacks, etc. In one implementation, the test management application retrieves the scripts, which are stored in the scripts database 106 and the script-to-component mappings, which are stored in the script-to-component mappings database 107, and the test management application executes test scripts that test the individual components of the software code that are mapped to components.

In one implementation, server 102 executes the test management application, which is accessible to users at client nodes using a special purpose client application, or a general purpose browser. For example, the test management functionality hosted by server 102 may be accessible to the work stations corresponding to the one or more testbeds 110 or other client nodes. The test management application hosted by server 102 can be used for planning or management purposes, or by testing engineers to select test scripts for targeted regression testing of a given body of code. In other implementations, the test management application can be hosted directly on a workstation or other computing device, such as a laptop. In one implementation, the testing functionality may be accessed by a browser client or special purpose client over a network or other connection to a server that hosts the test application. In one implementation, the test management application may be a stand alone application, or a module/plug-in to an existing code test management application suite.

In operation, when the test management application completes a full test or targeted test set, the test management application outputs which scripts detected bugs and which corresponding components failed. In one implementation, these test results may be stored in TIMS database 104. TIMS database 104, in one implementation, stores identifiers for the test scripts run during the test, bugs, if any, identified during execution of the test scripts, and the components of the software that failed or caused an error during execution of any given test script. In one implementation, if a new bug is discovered, the test management application reports the failure and the associated component to DDT database 108. DDT database 108 may also store identifiers for the script, associated bug, and associated failing component(s). FIG. 1 illustrated one possible testing environment in which the invention may operate; however, other implementations are possible. For example, the databases may be remotely located and accessed by a network. In addition, the term database is not intended to signify any particular form of data storage, and can represent a standalone database, a table in a larger database, a file, or some other form of data structure used for access to data.

B.2. Example Computing Platform

FIG. 2 illustrates an example hardware system 200, which may be used to implement a server 102. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communications ports that provide communication between additional peripheral devices, which may be coupled to hardware system 200.

Hardware system 200 may include a variety of system architecture; and various components of hardware system 200 may be rearranged. For example, cache 204 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

In one embodiment, the operations of the server 102 described herein are implemented as a series of software routines run by hardware system 200. These software routines comprise a plurality of series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received form a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

C. Targeted Regression Testing

The targeted regression testing (TRT) management application provides a selection of test operations. As described in more detail below, the TRT management application allows for selection of a full test set or a targeted test set to run, where the targeted test set includes a set of test scripts associated with a targeted subset of the components in a software code. A test management application, in one implementation, may receive from the TRT management application identifications of the test scripts to be run, retrieves the identified scripts from scripts database 106 and associated mappings from script-to-components mappings database 107, and then runs the scripts, logging the results to TIMS database 104.

In one implementation, a user may choose between a full test and a targeted test set. The full test tests all components of a given software code using automated regression scripts. For example, the test management application may execute 100% of the scripts for a given software code. In one implementation, a user may deselect particular components so that those components are not tested. The test management application typically performs a full test on new software releases. In one implementation, when the full test completes, the test management application may output which scripts detected a failure/bug and which components failed.

The targeted regression testing mode runs a subset of all tests that would otherwise be executed in a full test mode. For example, the targeted regression testing mode runs scripts associated with selected components of a given software code, where the subset may include only the components that have changed. Accordingly, to select a set of test scripts to execute in a targeted regression testing mode, the TRT management application may access the scripts data base 106 to select one or more scripts based on the components that have been changed from a previously tested version of the software. Accordingly, the test management application may execute only a percentage (e.g., 50%) of the scripts for a given software code. The subset may be determined in various ways. For example, in one implementation, the subset may include the components that have changed since the last time a full test was performed on the software code or since the last version of the software was released. In one implementation, the subset may be manually selected by a user. In one implementation, the subset may be based on a product train, which is a software version directed at a particular market segment (e.g., main train, technology train, service provider train, etc.)

In one implementation, the TRT management application may upload a list of scripts that are dedicated to the software code an/or a list of components. In one implementation, the list may be uploaded from a database such as the script-to-mappings database 107. The TRT management application may then provide to a user, related test areas with selected test scripts within those test areas to be tested. In one implementation, the test management application may execute the most effective scripts that detect the most defects or that detect unique defects over a script's lifetime. In one implementation, the test management application may execute scripts that have been fixed by a test group for particular technology areas or scripts that are known to have found defects in a given period. In one implementation, the test management application may execute the targeted test set to test basic connectivity of a given system (e.g., router), which may require only a percentage of the total number of scripts (e.g., 5%).

In one implementation, the TRT management application may display coverage information including components that have been selected for a given targeted test set. In one implementation, the TRT management application may also display a test group specific schedule of test rules, as well as the resource mappings.

By running a set of test scripts associated with a targeted subset of the components in a software code, the targeted test set reduces the amount of resources required for a given test. For example, resources may include engineers and testbeds. The targeted test set reduces the engineer workload by reducing the number of scripts to be executed per engineer during a given test. The targeted test set also gives the engineers more time to debug the failures that occur during test execution, which adds to the usefulness of the bugs that are reported. The targeted test set also makes the testbeds available for other tests or available to the engineers for fixing bugs, thus contributing to lowering mean times to repair (MTTRs). The targeted test set potentially reduces the number of tests that need to be executed on a given software version by selectively testing only the changed components or executing only the selected scripts (e.g., most effective scripts).

In one implementation, the testing software may select scripts based on the applicable scripts for the train of interest from the scripts-to-component database. Since the test management application utilizes the scripts-to-component mappings stored in the scripts-to-component database, there is no additional work needed by the test group other than maintaining the integrity of the data.

In one implementation, the components of a given software code may be shared among different product trains. Accordingly, scripts corresponding to each component may also be used to test different software code for different product trains.

D. Self-Learning Process

The TRT management application self-learns in that it automatically updates mappings between test scripts and the software components that the test scripts test. In one implementation, the TRT management application self-learns by analyzing historical test results. For example, when a component is updated or a new component is added to the software code, existing scripts may be applied or new scripts may be developed to test the changed or new component(s) to detect potential failure of those components. During testing, a given scripts may not cause a failure of a particular component even through that script is mapped to the component. Also, a given script that is not mapped to the component may inadvertently cause the component to fail. Such a failure may constitute a new bug in that the bug has not been previous stored in the TIMS database 104 or the DDT database 108. A bug may be described as an observed symptom indicating that a particular component failed as a script was being run. The failure may constitute a bug that is a known bug but a new bug for a particular product train or software version. In some cases, different scripts may detect the same bug. In a self-learning process, the TRT management application corrects or updates the script-to-component mappings to make sure that the appropriate scripts are executed to test the component. For example, the TRT management application may map two different scripts to a given component if both scripts test for different bugs.

In one implementation, the TRT management application may also automatically maintain script-to-engineer mappings based on the test environment. This provides easy maintenance of workload issues within an organization. The self-learning process is described in detail below in connection with FIG. 3.

The TRT management application may initiate the self-learning process periodically or on-demand. In one implementation, the TRT management application may initiate the self-learning process every time a new result set is added to TIMS database 104, every time components change or new components are added, every time scripts change or new scripts are added to scripts repository 106, etc.

FIG. 3 illustrates an example method associated with self-learning for targeted testing. In one implementation, to perform the self-learning process, the TRT management application retrieves bug entries from TIMS database 104 to determine whether to add or to modify the script-to-components mappings database 107. As FIG. 3 shows, for each bug entry, the TRT management application determines if the bug is a new bug (302). In one implementation, the TRT management application may retrieve bug entries from the TIMS database or other external source of bug entries. If the bug is not a new bug, the TRT management application determines if the association between the script that causes the bug and the bug itself is new (304). If the bug is a new bug or if there is a newly detected association between the script and the bug, the TRT management application modifies the script-to-component mappings database 107 to add a new script-to-component mapping (306). For example, if a component A failed and the bug was resulted from execution of test script A which was not previously associated with component A, the TRT management application updates the script-to-component mapping such that component A is mapped to script A. The TRT management application may then update the script-to-component database with the new script-to-component mapping. After the script-to-component mappings are computer, the new, learned mappings are available for subsequent TRT operations such as shown analysis, which is described in detail below.

E. Shadow Analysis

In particular implementations, the TRT management application may also include functionality facilitating the management and planning tasks associated with operation of one or more test beds or facilities. In one implementation, the TRT management application performs shadow analysis of the software code testing, where the TRT management application compares full test results to targeted test results to determine the risk and gains of running the targeted test set in future tests. As described in more detail below, the shadow analysis shows what might have been missed by running the targeted test set versus the full test set. Also, the shadow analysis also shows what resources (e.g., engineers, testbeds, and associated scripts) might be freed up and thus available for other tests (e.g., for additional software code versions or for other product trains). As such, the shadow analysis results facilitate a user in making intelligent decisions with regard to allocating test resources for testing software code for different product trains simultaneously, immediately and in the future.

FIG. 4 illustrates an example method for determining the risk and gains associated with target testing. As FIG. 4 shows, the TRT management application retrieves bug reports from the last full test (402). In one implementation, the bug reports may be stored in TIMS database 104, DDT database 108, or other appropriate database. The TRT management application analyzes the bug reports to determine which scripts detected failed components during the full test (e.g., script list A). The TRT management application determines which components changed since the last full test (404). The TRT management application runs the targeted test set to select the scripts corresponding to the changed components (e.g., script list B) (406). The TRT management application then compares the scripts that detected ailed components in the full test to the scripts corresponding to the changed components (408). The TRT management application then analyzes the comparison results (410). For example, the TRT management application may determine if the scripts corresponding to the changed components would have missed any bugs in a subsequent targeted test set. A miss would occur, for example, if a script that detected a failed component in the full test were not included in the group of scripts corresponding to the changed components. In other words, if any failed components that did not change after the last full test, their corresponding scripts would not be run in the subsequent partial test and thus would not detect the failures. The TRT management application may determine if any of the bugs misses are new bugs or new for a particular product train. The TRT management application may determine the degree of overlap between the last full test and the targeted test. These determinations would amount to an inherent risk in running the partial, targeted test set instead of the full test. The TRT management application then determines a risk value based on potential misses (412). In one implementation, the risk value may be a percentage of potential missed failures. In one implementation, the TRT management application may determine risk value associated with a particular product train.

While the partial test has a potential risk due to potential missed failures, the partial test also frees up resources due to a fewer number of scripts being run. For example, a certain number of engineers and testbeds may be required to run all of the scripts utilized during the full test. If only a few components were changed, the partial test ran would run only a few scripts corresponding to those changed components. This would potentially require fewer engineers and testbeds. The resource not utilized for the partial test may be utilized for other tests, partial or full. The TRT management application determined a gain value based on the potential freed up resources (414). In one implementation, the gain value may be a percent coverage (e.g., 20%) of a full test. In one implementation, the TRT management application determines which of the freed up resources may be used for particular product trains and then provides gain values for each product train. The TRT management application then reports the risk and gain (416). In one implementation, the TRT management application may send the report to a user (e.g., test engineer) or may store the results in an appropriate database.

While there is a trade off between the risk and gain associated with running the partial test, the resulting risk and gain value of the shadow analysis facilitates a user in making testing decisions. Such decisions may involve, for example, reallocating testing resources to various product trains, for immediate and future testing. By facilitating such decisions, the shadow analysis may facilitate in maximizing test coverage across multiple product trains and across multiple versions of software. For example, a user may want to run full tests for some product trains and run partial tests for other product trains.

The present invention has been explained with reference to specific embodiments. For example, while embodiments of the present invention have been described as operating in connection with a networks environments, the present invention can be used in connection with any suitable testing environment. Other embodiments will be evident to those of ordinary skill in the art. It is therefore not intended that the present invention be limited, except as indicated by the appended claims.

What is claimed is:

1. Software encoded in one or more computer-readable media and when executed operable to:
retrieve one or more bug reports from a previous full test of a software, wherein the full test executes test scripts to tests code components of a software code;
determine which of the test scripts detected failed components during the full test;

determine which of the code components changed since the last full test;

select the test scripts corresponding to the changed components;

compare the scripts that detected failed components during the full test to the selected scripts;

determine potential missed failures in a targeted test set that would execute only the selected scripts;

determine a gain value associated with running the targeted test set; and generate a report including the gain value.

2. The software of claim 1 further operable to determine a risk value based on the potential misses.

3. The software of claim 2 wherein the risk value is based on percentage of potential missed failures.

4. The software of claim 1 wherein the gain value is based on an amount of resources that would be freed up by running the targeted test set instead of the full test.

5. A method comprising:

retrieving one or more bug reports from a previous full test of a software, wherein the full test executes test scripts to tests code components of a software code;

determining which of the test scripts detected failed components during the full test;

determining which of the code components changed since the last full test;

selecting the test scripts corresponding to the changed components;

comparing the scripts that detected failed components during the full test to the selected scripts;

determining potential missed failures in a targeted test set that would execute only the selected scripts;

determining a gain value associated with running the targeted test set; and generating a report including the gain value.

6. The method of claim 5 further comprising determining a risk value based on the potential misses.

7. The method of claim 6 wherein the risk value is based on percentage of potential missed failures.

8. The method of claim 5 wherein the gain value is based on an amount of resources that would be freed up by running the targeted test set instead of the full test.

9. An apparatus comprising:

means for retrieving one or more bug reports from a previous full test of a software, wherein the full test executes test scripts to tests code components of a software code;

means for determining which of the test scripts detected failed components during the full test;

means for determining which of the code components changed since the last full test;

means for selecting the test scripts corresponding to the changed components;

means for comparing the scripts that detected failed components during the full test to the selected scripts;

means for determining potential missed failures in a targeted test set that would execute only the selected scripts;

means for determining a gain value based on potentially freed up resources associated with running the targeted test set instead of the full test; and means for generating a report including the gain value.

* * * * *